United States Patent [19]

de Hond

[11] Patent Number: 5,737,533

[45] Date of Patent: Apr. 7, 1998

[54] SYSTEM FOR GENERATING A VIRTUAL REALITY SCENE IN RESPONSE TO A DATABASE SEARCH

[75] Inventor: Maurice de Hond, Amsterdam, Netherlands

[73] Assignee: Wegener Internet Projects BV, Apeldoorn, Netherlands

[21] Appl. No.: 548,873

[22] Filed: Oct. 26, 1995

[51] Int. Cl.[6] ............................ G06F 13/38; G06F 17/30
[52] U.S. Cl. ........................ 395/200.49; 395/357
[58] Field of Search ..................... 395/333, 334, 395/335, 356, 357, 200.09, 200.47, 200.48, 200.49

[56] References Cited

U.S. PATENT DOCUMENTS 5,638,523  6/1997  Mullet et al. .................... 395/326

OTHER PUBLICATIONS

"HyperImages: Using Object Recognition For Navigation Through Images in Multimedia", D. Lowe and A. Ginige, pp. 418–429, Feb. 9, 1995.

"Scientific Graphics and Visualization Come to the Internet", Scientific Computing World, D. Moralee, pp. 31, 33, 34 & 36, Mar., 1995.

Verity, John W., Ready or Not, the Electronic Mall is Coming, Business Week, Nov. 14, 1994.

Prodigy to offer NYNEX Yellow Pages, Information industry Bulletin, Dec. 23, 1993, v9, n47–8, p. 11.

Blankenhor, Dana, Virtual mall opens in cyberspace, Newsbytes, Jun. 20, 1994.

Anis, Nick, RBOC to market yellow pages on Internet, Prodigy, Newsbytes, Aug. 5, 1994.

Yellow pages: NYNEX to offer Yellow Pages on the Internet, EDGE, on & about AT&T, Aug. 8, 1994, v9, n315, p. 8.

"Using Structured Documents for Implementing Product/ Service Yellow Pages Architecture on the Internet", Dennis S. Arnon et al., pp. 312–321, Dec. 1994.

Primary Examiner—Richard L. Ellis
Attorney, Agent, or Firm—Wells, St. John, Roberts, Gregory & Matkin, P.S.

[57] ABSTRACT

A system comprising a server having a memory, and a database defined in the memory; and a client in communication with the server, the server communicating to the client an interface for use in requesting a search of the database, and the server having virtual reality means for generating a virtual reality scene, the virtual reality scene varying depending on the results of the search.

21 Claims, 7 Drawing Sheets

SYSTEM FOR GENERATING A VIRTUAL REALITY SCENE IN RESPONSE TO A DATABASE SEARCH

TECHNICAL FIELD

The invention relates to systems including databases. More particularly, the invention relates to systems including displays for displaying the results of a database search. The invention also relates to computer networks.

BACKGROUND OF THE INVENTION

Yellow Pages are known by everyone as a directory of businesses, as well as a medium for advertising. The concept of Yellow Pages was developed more than 80 years ago. This type of directory contains information about businesses categorized by headings. The categories are defined by type of product or service sold by the various businesses. Some basic information (e.g.; business name, address, phone number) is provided for each included business. Additional information can be included if a business is willing to pay extra. For example, a business can pay extra to have an in-column or display add included.

Businesses find the Yellow Pages to be a useful advertising resource. Users find the Yellow Pages to be a handy resource for finding solutions to problems.

Yellow Pages are used in all developed countries, and many other countries. Household members turn to Yellow Pages quite frequently (e.g., 100 times per year in the United States, 10–75 times per year in other countries). The Yellow Pages industry is very profitable. It is not uncommon for earnings after tax to exceed 25% of revenues. Worldwide revenues are higher than $15 billion.

Different Yellow Pages directories are published for different geographical regions (e.g.; cities, metropolitan areas, counties, collections of towns, etc.). For different geographical region, there may be several publishers of competing Yellow Pages. In addition, there are various specialty Yellow Pages, such as ethnic Yellow Pages (e.g., the Black Pages, etc.) of businesses owned by certain ethnic groups, toll free or "800" directories, etc.

Publishers sell advertisements in Yellow Pages using various techniques. Local or regional telephone companies often play a major part in sales of advertising space. These local or regional telephone companies hire a sales agent, such as L. M. Berry (TM) of Dayton, or Donnely (TM) to sell the advertising space.

Yellow Pages directories found in different countries are similar in organization and appearance to those discussed above.

With the advent of the electronic age, there is a push to make the information normally contained in Yellow Pages available in electronic media. For example, it is known to provide CD ROMs containing at least the data of Yellow Pages, if not the advertising. Such CD ROMs may be published by the same publishers who publish the paper versions of the Yellow Pages. The publishers may take the same data from the paper version, and publish it in on a CD ROM. Such electronic Yellow Pages may also be contained in commercial databases, such as DIALOG (SM) databases. DIALOG is a service mark of Dialog Information Services, Inc., which is a subsidiary of Lockheed Corporation.

The advantage of having the information in an electronic form is that it becomes much easier to search the information. For example, if you have a message to call a phone number, but cannot make out the callers name, it is possible with an electronic version of the Yellow Pages to search for the phone number, and find the business name and address. Such a search is not easily performed with a paper version, because the data is typically organized alphabetically by business name, not numerically by phone number. Other types of searches are also possible, with the electronic version, by using conventional database searching techniques and boolean connectors.

Some electronic databases including Yellow Pages information are now appearing on the Internet.

The Internet is a worldwide network of computers. The Internet began under the name ARPANET, and was started by the Advanced Research Projects Agency of the U.S. Department of Defense. For the military, computers are useful for command and control, and the original reason for ARPANET was to provide redundant connections between computers so as to have communications that are not subject to failure. Protocols were developed that allowed communications between computers over any available route, instead of a fixed route. A problem with an earlier protocol was that it restricted the number computers that could be on the ARPANET. A new protocol, called Transmission Control Protocol/Internet Protocol (TCP/IP), was later developed, and is now one of the most widely accepted networking protocols. Universities and research facilities communicated over ARPANET. In the late 1980s, the National Science Foundation developed a network (NSFNET) to connect its supercomputer centers, and this network used the TCP/IP protocols. Eventually, publicly and privately funded networks including ARPANET, and various other networks (UUCP, MILNET, USENET, BITNET, CSNET, NASA Science Internet) joined the NSFNET networks, and the collection of networks is called the Internet. The Internet today includes an international connection of intercommunicating networks, both privately and publicly funded. Most computer systems support TCP/IP, and connecting to the Internet is easy and inexpensive.

The World Wide Web is the multimedia aspect of the Internet. The World Wide Web originated at CERN (Centre Européen pour la Récherche Nucleaire in Geneva, Switzerland). Hyperlinks in documents provide for immediate connection to other documents which may be on the same or on a different computer. By clicking or selecting hyperlinked terms or graphics on a web page, you are taken to another web page, or to another location in the web page you are currently reading. This is useful, for example, if reading a paper that has footnotes—while reading the main text of document, you can select a hyperlink and be taken directly to the appropriate footnote, and then, with a click of a button, back to the main text. Hyperlinks are also useful for reading a document containing complex terminology for which definitions are hyperlinked. Further, some people collect a list of resources relevant to a topic of interest, and provide hyperlinks to each of the resources from a web page. Web pages are typically written using HTML (hyper text markup language). HTML documents or pages typically include text, and references to graphics files on the servers, as well as hyperlinks. When viewed on a client computer, the graphics are combined with the text on a single screen, and some words are underlined or differently colored (or a box may appear around graphics). If these special words or graphics are clicked on with a mouse, a hyperlink prescribed in the HTML document will be followed. This will result in the client being connected to another document or file (e.g.; graphics file, sound file, etc.) which may or may not reside on a different server, or to another section of the same document. HTML is well known, and many references are available on-line that describe HTML. HTML is also described in *HTML Sourcebook*, by Ian S. Graham, published by John Wiley & Sons, Inc. HTML documents that are loaded on servers can be viewed by remote computers (clients) that have web browsers loaded thereon. One well known web browser is Mosaic (TM), available from NCSA (the National Center for Supercomputing Applications at the University of Illinois at Champaign-Urbana). Another popular web browser is Netscape (TM), available from Netscape Communications Corporation, 501 East Middlefield Road, Mountain View, Calif., 94043.

Hyperlinking is also known in other applications, such as in FolioViews (TM) documents.

Web browsers such as Mosaic and Netscape allow a client to view text, graphics (e.g.; "GIFs", "JPEGs"), or a combination of text and graphics presented to the client from a server accessed by the client. The servers have unique URLs (uniform resource locators), using which the client can connect to a desired server. The typical format of a URL is HTTP://WWW.SERVER.COM/DOCUMENT.HTML, where "SERVER" would be replaced by the name of a server; "COM" would be replaced by a country code if the server is outside the U.S., or by "MIL" if a military server, or "ORG" if an organization, or "EDU" if an educational server, etc.; and where "DOCUMENT.HTML" would be replaced by the name of a document or file on the server which the client is accessing, or omitted to pull up a "home page" (a starting point for the web site). Web browsers can also be configured to launch "helper applications" when the client is presented with a file type that the browser cannot handle. File types are indicated by the extension after a dot (".") in the filename; e.g.: .JPG; .GIF, .HTML, .WAV, .MPG, etc. If the client has loaded thereon viewer or player software that can handle such a file type, the browser on the client can be configured to start (launch) the viewer software (the helper application) acting on such files if they are received. For example, if the client receives a .WAV file (an audio file), the client may automatically launch an audio player on the client computer so that the user at the client hears the sound without having to manually start the audio player on the client computer. Similarly, if the client receives a .MPG file (a soundless movie file in "MPEG" format), the client may automatically launch a mpeg player to start a movie.

Some forms of Yellow Pages directories are now available on the World Wide Web. For example NYNEX maintains a web site.

Other networking protocols and hardware are also known and used for setting up networks such as local area networks (LANs) and wide area networks (WANs).

Various businesses are finding it useful to be physically located close to other businesses that sell the same or similar goods and services. Businesses that are located next to other businesses that sell similar goods and services see an increase in traffic (visits by potential customers) because the customer who is interested in a particular good or service can more easily comparison shop or locate hard to find goods or services. For example, car dealers are frequently located near other car dealers, some restaurants are located near other restaurants, some furniture stores are located near other furniture stores, etc.

It would be desirable to provide Yellow Pages information in a visually stimulating manner so as to encourage advertising by businesses, and use of the Yellow Pages by consumers. It would also be desirable to present electronic information from a database in a form where similar goods and services are grouped together.

BRIEF DESCRIPTION OF THE DRAWINGS

Preferred embodiments of the invention are described below with reference to the accompanying drawings, which are briefly described below.

SUMMARY OF THE INVENTION

The invention provides a system comprising a server having a memory, and a database defined in the memory; and a client in communication with the server, the server communicating to the client an interface for use in requesting a search of the database, and the server having virtual reality means for generating a virtual reality scene, the virtual reality scene varying depending on the results of the search.

Another aspect of the invention provides a server comprising a memory, and a database defined in the memory, the database including data about a first classification of businesses, which data respectively includes business name, address, phone number, and goods or services provided by the business, the database further including data about a second classification of businesses, which data respectively includes more data than is provided for each first classification business; communication hardware providing for communication between the server and clients via TCP/IP; the server communicating to the client an interface for use in requesting a search of the database in response to a client connecting to the server, and the server generating a virtual reality scene in response to the client requesting a search of the database, the virtual reality scene varying depending on the results of the search.

DETAILED DESCRIPTION OF THE PREFERRED EMBODIMENTS

Figure 1:
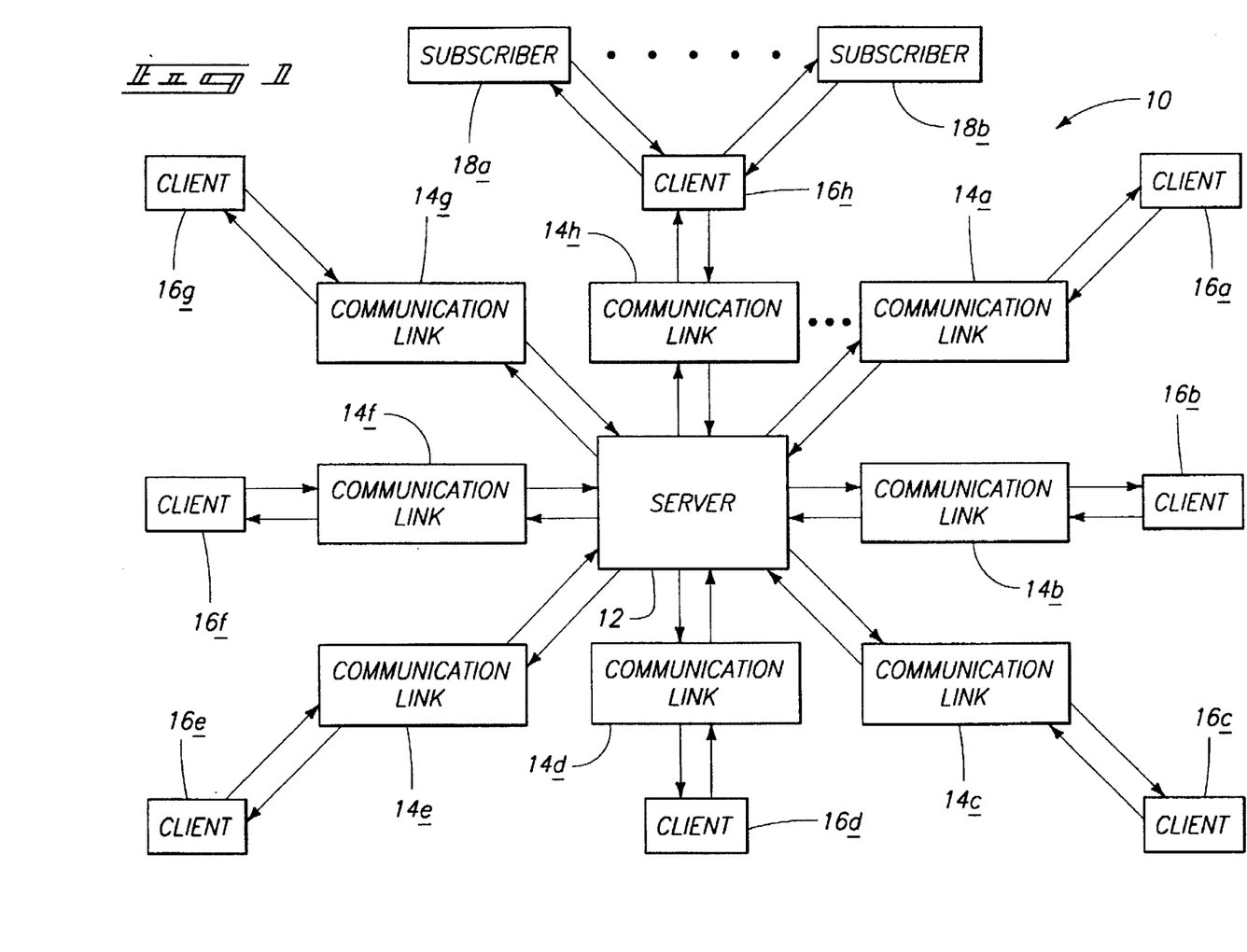
FIG. 1 is a block diagram illustrating a system embodying the invention.

FIG. 1 illustrates a system 10 embodying the invention. The system 10 comprises a server 12, which can be a minicomputer, a microcomputer, a UNIX (TM) machine, a mainframe computer, a personal computer (PC) such as an Intel (TM) 286, 386, 486, or Pentium (TM) personal computer or clone thereof or Apple (TM), Macintosh (TM), or PowerPC (TM) personal computer or clone thereof, or any other appropriate computer. The server 12 includes typical components (see FIG. 2) such as a processor 20, input devices 22 (e.g.; keyboard and mouse), output devices 24 (e.g.; monitor and printer), ROM 26, RAM 28, memory 30 (e.g. hard drive, disk drive, tape unit, CD-ROM, etc.), serial ports (not shown), parallel ports (not shown), communication hardware 32, which may either be internal or external, such as internal communication cards (e.g., modem card or network card) or external communication hardware (e.g., external modem), etc. The server 12 has a multi-user, multi-tasking operating system such as UNIX (if the server is a UNIX machine), LINUX (if the server is a personal computer), etc.

The system 10 further comprises (see FIG. 1) a plurality of clients 16a–h. The clients 16a–h comprise computers such as minicomputers, microcomputers, UNIX (TM) machines, mainframe computers, personal computers such as an Intel (TM) 286, 386, 486, or Pentium (TM) personal computers or clones thereof or Apple (TM), Macintosh (TM), or PowerPC (TM) personal computers or clones thereof, or any other appropriate computer, in any combination. In other words, the client 16a may be a different computer than the client 16b, which in turn may be different from the client 16c, etc. The clients 16a–h include typical components (see FIG. 2) such as a processor 34, input devices 36 (e.g.; keyboard and mouse), output devices 38 (e.g.; monitor and printer), RAM 40, ROM 42, memory 44 (hard drive, disk drive, tape unit, CD-ROM, etc.), serial ports (not shown), parallel ports (not shown), communication hardware 46, which may either be internal or external, such as internal communication cards (e.g., modem card or network card) or external communication hardware (e.g., external modem), etc. The clients 16a–h respective have loaded in memory 44 web browsers 48 such as Mosaic or Netscape (see FIG. 2). The clients 16a–h also respective have loaded in memory 44 virtual reality viewers 50. The term "virtual reality", as used herein, is not necessarily meant to describe the type of virtual reality that involves the use of gloves and helmets or goggles, but instead is used to describe the type of virtual reality that permits navigation through a scene, or manipulation of objects, using a mouse and keyboard, such as by using QuickTime VR, developed by Apple Computer, Inc., or the Virtual Reality Modeling Language (VRML). VRML was apparently developed by Gavin Bell of Silicon Graphics, Inc.; Anthony Parisi, Intervista Software; and Mark Pesce, VRML list moderator.

VRML is a language which can be used for developing multi-participant interactive simulations, and virtual worlds hyperlinked via the World Wide Web. In the illustrated embodiment, the multi-participant aspect of VRML is not necessarily used, except that, of course, multiple client can access and use the server 12 simultaneously. The first version (Version 1.0) of VRML provides for creation of virtual worlds or scenes, and virtual objects.

A virtual reality scene is a space in which a user can navigate by looking up, looking down, turning around, zooming in, or zooming out. A virtual reality object is an interactive object. By clicking or dragging virtual reality objects, you can view different sides of the object to examine the object, like merchandise in a store. HTML pages can be hyperlinked to virtual reality objects.

HTML 3.0 (a version of HTML) lets a HTML developer decide which portions of a screen are refreshed and which portions remain unchanged. Dynamically produced HTML pages are known in the art.

The QuickTime VR viewer can be obtained online by connecting to Apple's server (HTTP://QTVR.QUICKTIME.APPLE.COM).

Figure 2:
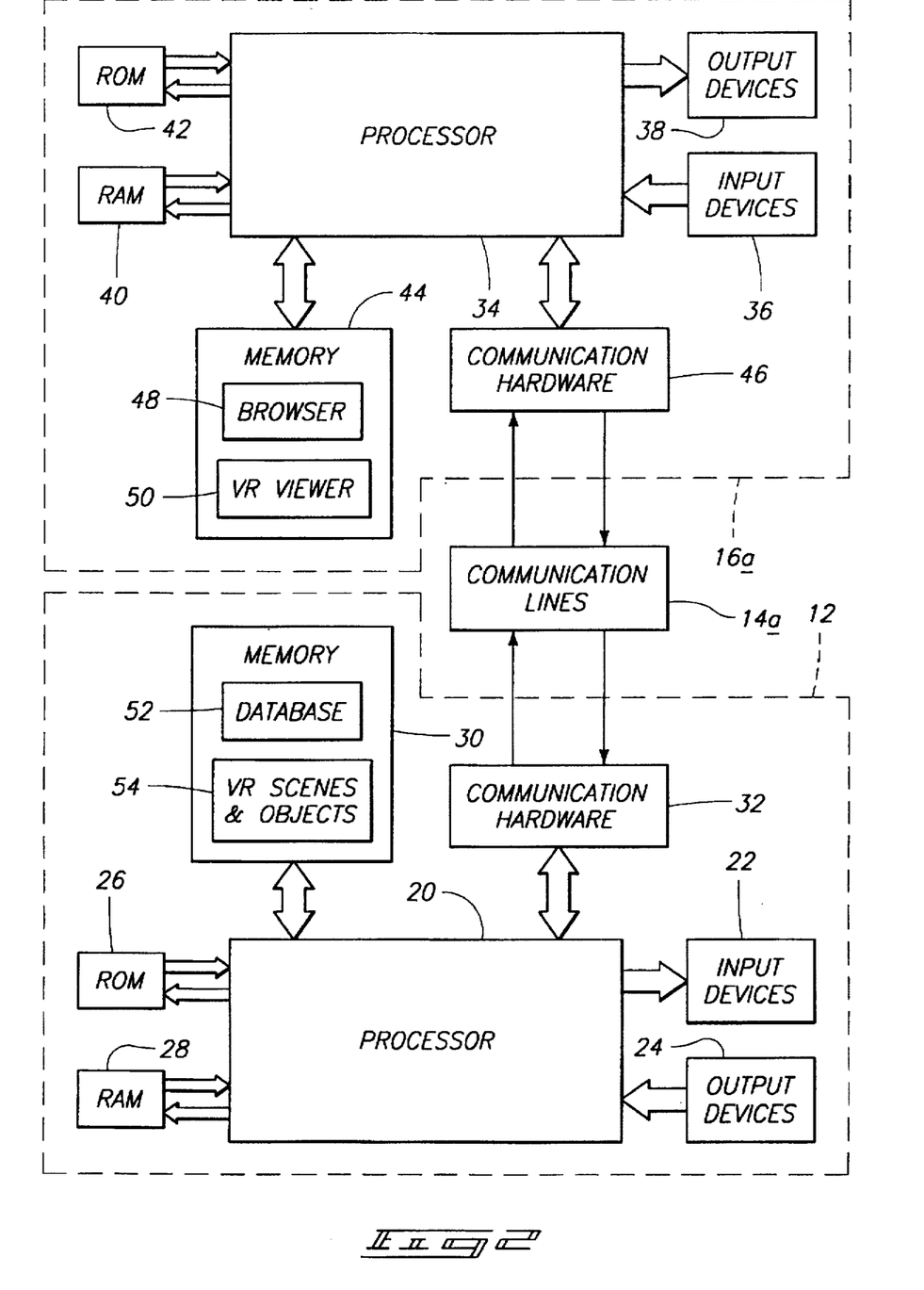
FIG. 2 is a block diagram illustrating in greater detail some of the components included in the system of FIG. 1.

The web browsers are each configured to launch the virtual reality viewer 50 as a "helper application" when the client is presented with a virtual reality file type. For example, with a Netscape browser, this is done by clicking or pulling down the "Options" menu, clicking on "Preferences" so the preferences window opens, clicking on "Helper Applications" so the helper applications preferences window opens, and then selecting the virtual reality player (e.g.; C:\QTVR\PLAYER.EXE) to launch when a virtual reality type file is encountered (e.g., a file with extensions .WRL, .QT, or .MOV). New file types can be added by clicking the "New Type" button. File types are indicated by the extension after a dot (".") in the filename; e.g.: .JPG; .GIF, .HTML, .WAV, .MPG, etc. VRML files have the extension .WRL, and QuickTime VR files have the extension .QT or .MOV (as do regular movies). More advanced virtual reality languages (or language versions) for use with the World Wide Web are also being developed, and are employed in alternative embodiments of the invention.

The clients 16a–h are respectively connected to the server 12 via communication links 14a–h. Some or all of the communication links 14a–h may be either temporary links or permanent links. The communication links 14a–h comprise satellite links, RF links, LAN links, WAN links, telephone line links, or any link for permitting communication between computers, in any combination. In other words, the link 14a may be a different type of link than the link 14b, which in turn may be a different type of link than the link 14c, etc.

Although only a limited number of clients are shown connected to the server 12, in the illustrated embodiment, a large number of clients can be simultaneously connected to the server 12.

Different protocols may be employed for communication between the clients 16a–h and the server 12. In the preferred embodiment, the TCP/IP protocol is employed for communication between the server 12 and the clients 16a–h. More particularly, in the illustrated embodiment, the server 12 is a node on the Internet, and one or more clients 16a–h selectively access the server 12. In one embodiment, one or more of the clients 16a–h are themselves servers maintained by service providers (e.g., Netcom (TM), CompuServe (TM), AmericaOnline (TM), etc.) which provide for communication between a large number of subscribers (or users) 18a–b and the server 12. Typically, but not necessarily, the subscribers 18a–b will respectively comprise personal computers (PCs).

The server 12 has a database 52 defined in the memory 30. In the illustrated embodiment, such memory 30 comprises a hard disk drive having information arranged thereon to define the database 52, but could alternatively comprise one or more CD-ROMs, random access memory (RAM), read only memory (ROM), optical storage, tape storage, or any other appropriate data storage medium.

In one embodiment, the database 52 is a database of businesses and contains a predetermined amount of basic information (e.g.; business name, address, phone number) for each included business. In this embodiment, the database 52 includes additional information about a business if a business is willing to pay extra. The additional information comprises graphics (e.g., a storefront 98), size of display information, location of display information, virtual reality scenes, virtual reality objects, and hyperlinks, or any combination of such additional information for each business.

In one embodiment, the database is a Wide Area Information Servers (WAIS) database. In alternative embodiments, the database of the server 12 is a Sybase (TM), or Oracle (TM) database. Other forms of databases can be employed. WAIS is designed as a client-server system, and WAIS clients are able to interrogate WAIS databases using a well known protocol. Because this protocol is supported by many World Wide Web clients, it is usually possible for a client to directly interrogate a WAIS server by constructing a URL (uniform resource locator) including appropriate queries that points to the WAIS server. On the other hand, some clients do not support the WAIS protocol, and other methods, such as FORM interfaces, are provided from the server to the client for constructing WAIS queries. FORM interfaces are know to those who use the World Wide Web. A FORM interface has fields that can be filled in, or pop up menus from which selections can be made, and usually has a "SEND" or "QUERY" button and a "CLEAR" or "CANCEL" button. There are a large number of gateway programs that allow non WAIS capable clients access to a WAIS server.

One server-side program for accomplishing these tasks is WAIS.PL, a PERL (practical extraction and reporting language) script (program) that obtains a query string from a client and passes the query to a WAIS database query engine (WAISQ) at the server, and returns the results to the user as an HTML document.

Other server-side programs for accomplishing these tasks include SON-OF-WAIS.PL, a perl script written by Eric Lease Morgan of North Carolina State University Libraries; KIDOWAIS.PL, another PERL script; SFGATE, which does not access a server-side WAIS query engine but instead has WAIS client software built-in; WAISGATE, available from WAIS Inc.; and WWWWAIS, a C program that acts as a gateway between the programs (WAISQ and WAISSEARCH) that search WAIS indexes and a FORM capable web browser.

There are also many software programs for linking the World Wide Web to commercial database packages like Oracle or Sybase. One is GSQL-ORACLE BACKEND, for use with Oracle databases, which was written by James Pitkow of the Graphics, Visualization, and Usability Center at the Georgia Institute of Technology.

Another is WEB/GENERA, for use with Sybase databases, which was developed by Stanley Letovsky with support of the National Science Foundation.

Another is WDB, for use with Sybase databases, which allows use of high-level description files to specify the structure of a database and the format of responses so that an interface between the World Wide Web and a Sybase database can be developed without the need to write any code. WDB was written by Bo Frese Rasmussen of the European Southern Observatory.

Another is GSQL, a C program, for use with Sybase or other SQL databases. GSQL was written by Jason Ng of NCSA (National Center for Supercomputing Applications at the University of Illinois at Champaign-Urbana).

Another is HTORACLE, for use with Oracle databases. HTOracle was written by Arthus Secret of CERN (Centre Européen pour la Récherche Nucleaire in Geneva, Switzerland).

Another is ORAPLEX, for use with Oracle databases. ORAPLEX was written by Guy Decoux of the Institut National de la Recherche Agronomique in France.

Another is TR-WWW, which is a Macintosh-based search engine that works only with a MacHTTP (TM) server.

Most of the above database gateway programs, as well as detailed documentation discussing their use, is available via the World Wide Web. Documentation is also available in various books that describe the World Wide Web and HTML. Many such gateway programs are available by connecting to NCSA's server at the University of Illinois, Champaign-Urbana (FTP://FTP. NCSA.UIUC.EDU).

The memory 30 of the server 12 is also loaded with graphics, virtual reality scenes, and/or virtual reality objects 54 that will be described below in greater detail.

FIGS. 3 and 5–10 illustrates operation of the system.

Figure 3:
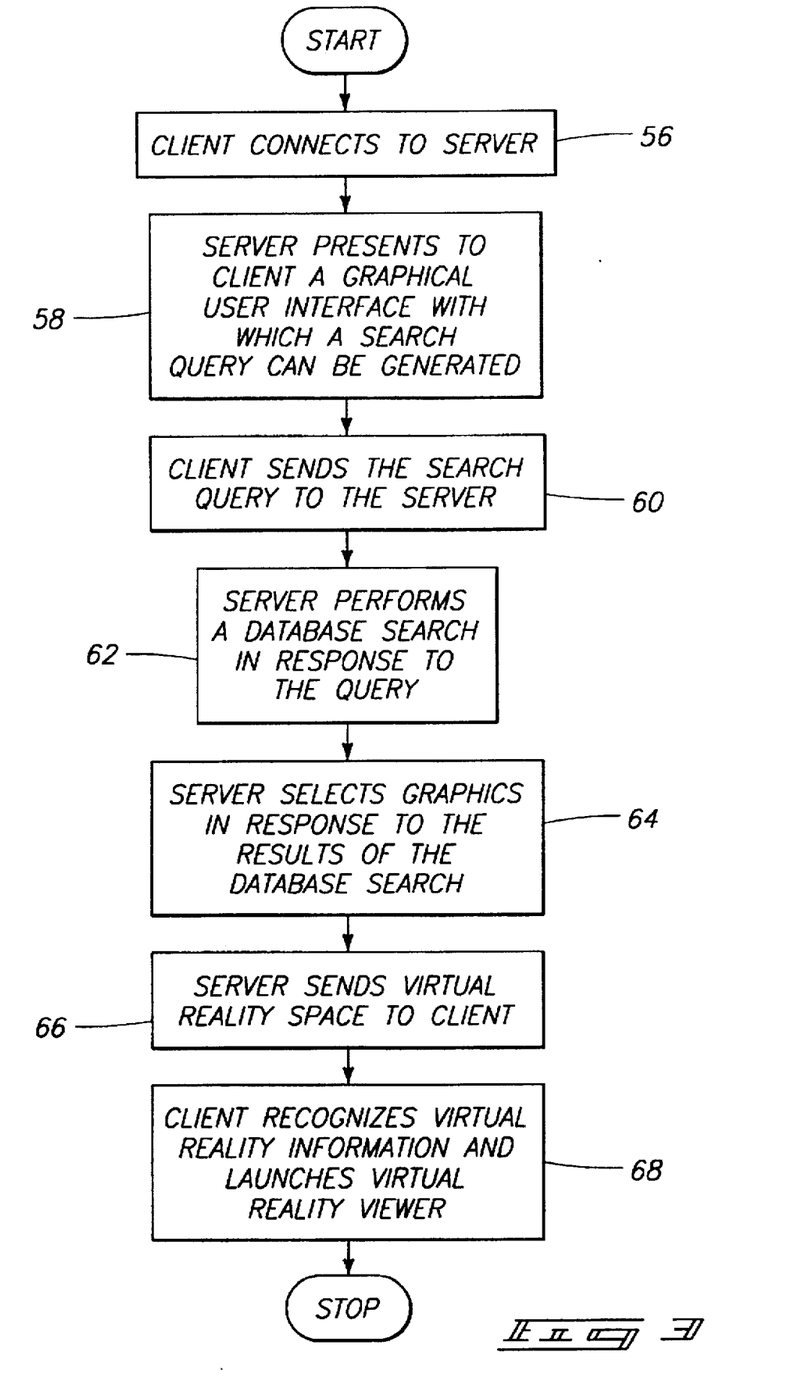
FIG. 3 is a flowchart illustrating operation of the system of FIG. 1.

In step 56, one of the clients 16a–h connects to the server 12. For example, the client connects to the server 12 via the World Wide Web by entering on a client browser the URL of the server. After step 56, the system proceeds to step 58.

In step 58, the server 12 presents to the client a graphical user interface 88 including a query area 90 in which a search query can be generated. In one embodiment, this graphical user interface includes a FORM interface, discussed above. The interface optionally comprises pull down menus. In one embodiment, the graphical user interface 88 comprises a graphical representation of an elevator including an area 90 in which query information can be entered or selected from menus. In one embodiment, the elevator is a virtual reality space which the user of the client virtually enters, and within which the search query is generated. In one embodiment, the user is able to select the number of "hits" the user wants to see. In an alternative embodiment, the number of "hits" generated by the search is limited to a predetermined number. After step 58, the system proceeds to step 60. In one embodiment, the interface is particularly suited for searching for businesses, and provides for searching at least by category (type of goods or services). In alternative embodiments, the interface provides for searching of any desired field selected from a plurality of fields, such as category (type of goods or services), location, phone number, zip code, area code, subcategory (e.g. type of cuisine—Pizza, German, Vietnamese, Chinese), sublocation (Eastside, North, Suburbs, etc.).

At step 60, the client sends the search query to the server. After step 60, the system proceeds to step 62.

At step 62, the server performs the database search in response to the query. In the illustrated embodiment, visual indicators give the appearance of movement of the elevator while the search request is being processed. For example, floor indicators 92a–f can change to give the impression the elevator is ascending or descending. Movement of bars or other graphics 94a–e can take place to give the impression of a window 96 in the elevator, and movement at the elevator relative to a building. For example, in one embodiment, the server causes the client to display movement of the elevator (e.g., a movie, such as a QuickTime movie or MPEG movie, simulates movement of the elevator). After step 62, the system proceeds to step 64.

At step 64, the server creates a virtual reality space by selecting and assembling graphics or virtual reality spaces and items in response to the results of the database search. At step 66, the server 12 sends a virtual reality space to the client. At step 68, the client recognizes that virtual reality information is being sent, and launches a virtual reality viewer (e.g.; a web browser launches a virtual reality helper application such as QuickTime for Virtual Reality).

For example, in one embodiment, a navigable virtual reality scene is presented comprising a street having storefronts 98, 100, 102, 104, 106, 108 representing the best hits from the database search. In one embodiment, a predetermined minimum amount of information about each business is provided on the street (e.g., on a letterbox at the end of the street or on a window or door of a small storefront). If the business is one that paid extra, it will have a storefront. Businesses that pay extra may also have a storefront closer to the elevator or of a different size.

In one embodiment, the virtual reality scene includes areas (e.g., billboards) including advertising of related products or services. For example, if the search was a search for restaurants, a billboard 100 may show an advertisement for a cola product. In one embodiment, the advertising comprises a movie (e.g., a movie playing within an area of the screen, such as to give the appearance of a movie projected on a building or billboard). Individual businesses may have their own signs which may rotate, for example. Other features of streets, such as street lamps, phone booths, etc., may be presented for added visual effect.

In the illustrated embodiment, if a user of a client navigates into one of the storefronts, the user is sent by hyperlink to a server maintained by the associated business. In an alternative embodiment, if a user of a client navigates into one of the storefronts, the user encounters another virtual reality space in which the user may pick up and inspect virtual objects, and make purchases via the server 12.

It should be noted that the appearance of the street presented will vary depending on the results of the database search. The presented street will have an appearance of interest to the user doing the search, and will have storefronts of businesses of interest to that user (e.g., in a certain geographic location, such as within a certain zip code, providing certain goods or services, or having a certain name). Thus, like businesses are grouped together for the user's convenience on a boulevard. In one embodiment, the appearance of the street (excluding the storefronts) changes depending on the selected category; e.g., because people go to restaurants at night, a search for restaurants can produce a nighttime scene. Different types of music can play while a user navigates through a scene depending on the category selected. Alternatively, audible advertising can play while the user navigates through the scene.

Figure 4A:
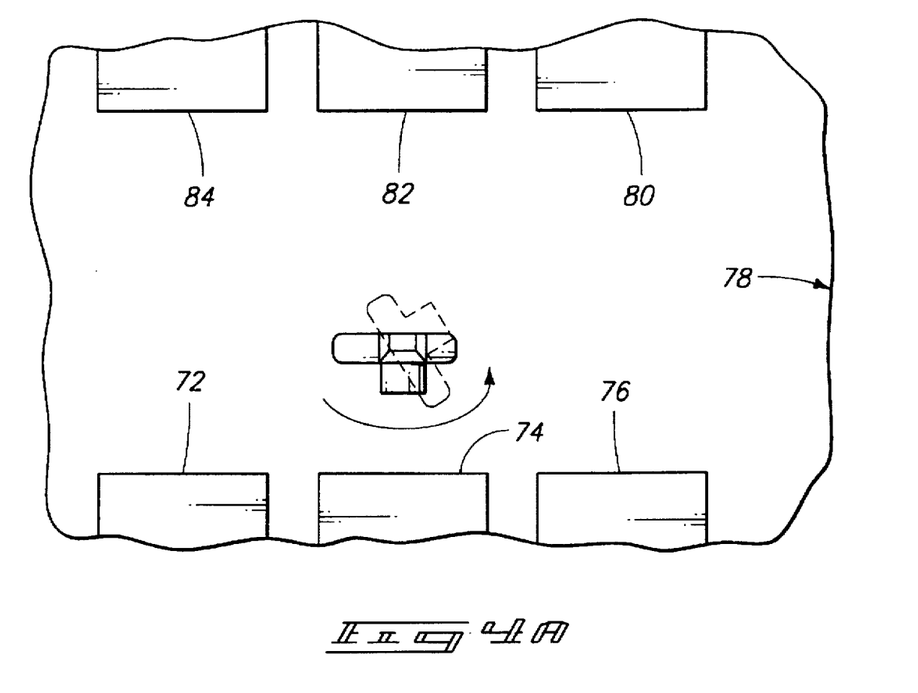
FIG. 4A illustrates steps used to make a virtual reality scene.
Figure 4B:
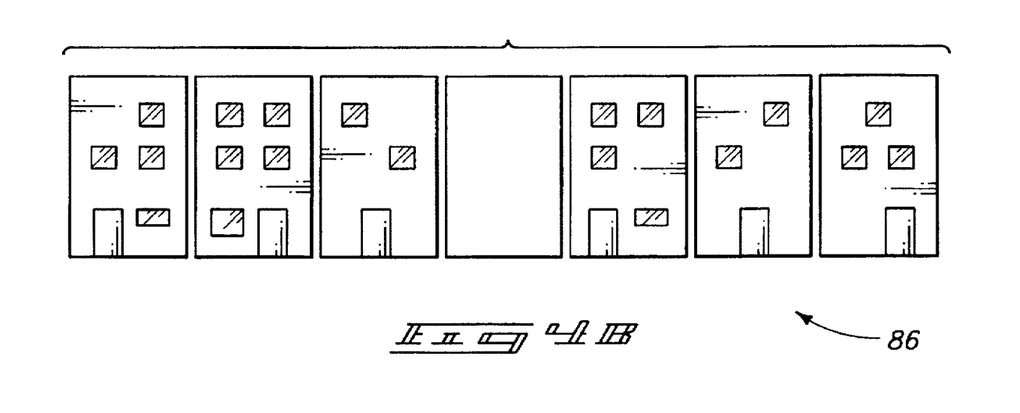
FIG. 4B illustrates steps, subsequent to the steps in FIG. 4A, used to make a virtual reality scene.

FIGS. 4A and 4B illustrate one embodiment of making a virtual reality scene to be used in displaying database search results. As illustrated in FIG. 4A, a camera 70 is used to take several pictures of an actual street from various vantage points. These photographs are digitized, and electronically stitched together, as illustrated in FIG. 4B. To allow stitching of photographs where the camera turns corners, the images are warped such that straight lines become curved lines, so that all adjacent photographs can be stitched together side by side to form a panorama. The virtual reality player in the client computer only views one small portion of the stitched photograph panorama at a time, and unwarps that portion so that straight lines appear straight. As the user navigates in the scene, the virtual reality player keeps up with the user's movements, unwarping and displaying the user's vantage point of the panorama on the fly. In an alternative embodiment, the virtual reality streets are formed using animations.

In one embodiment, the server contains a regular graphic (e.g., a GIF or JPEG) of a storefront for each business, and the server creates a virtual reality scene by stitching together graphics in response to the results of a database search.

Objects displayed when entering certain stores are virtual reality objects. Virtual reality objects are unlike scenes because scenes involve navigating through a single panoramic image, whereas objects are defined from a number of images of the object taken at different angles. In an alternative embodiment, the virtual reality objects are formed using animations.

Figure 5:
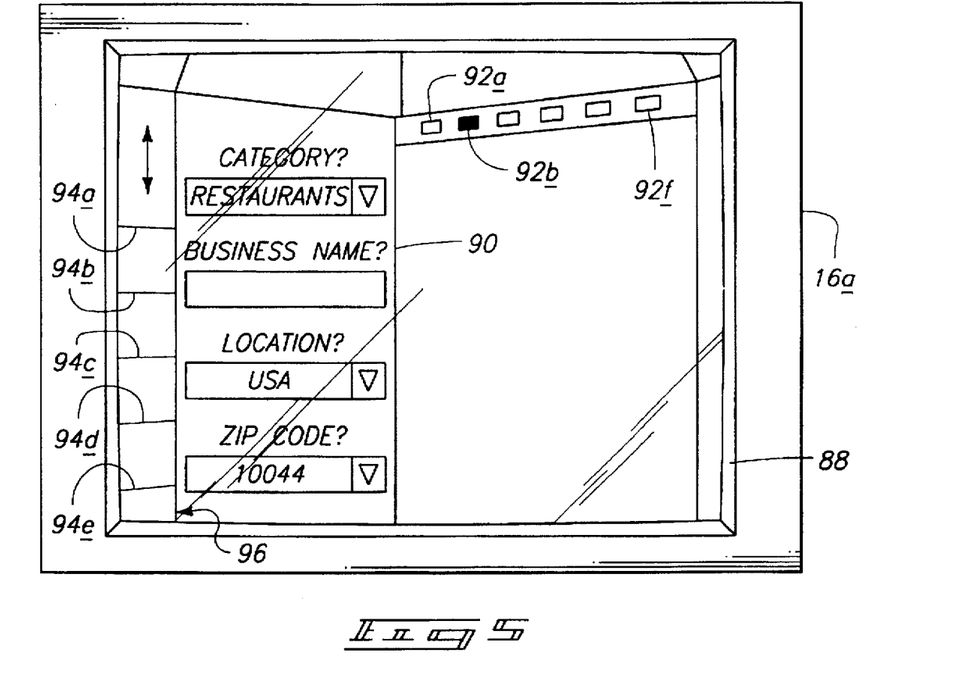
FIG. 5 illustrates a sample virtual reality scene produced by the system of FIG. 1.

FIGS. 5-10 illustrate screens that are sent from the server to the client in response to a database search query. FIG. 5 illustrates the graphical interface and how any of various available fields can be searched.

Figure 6:
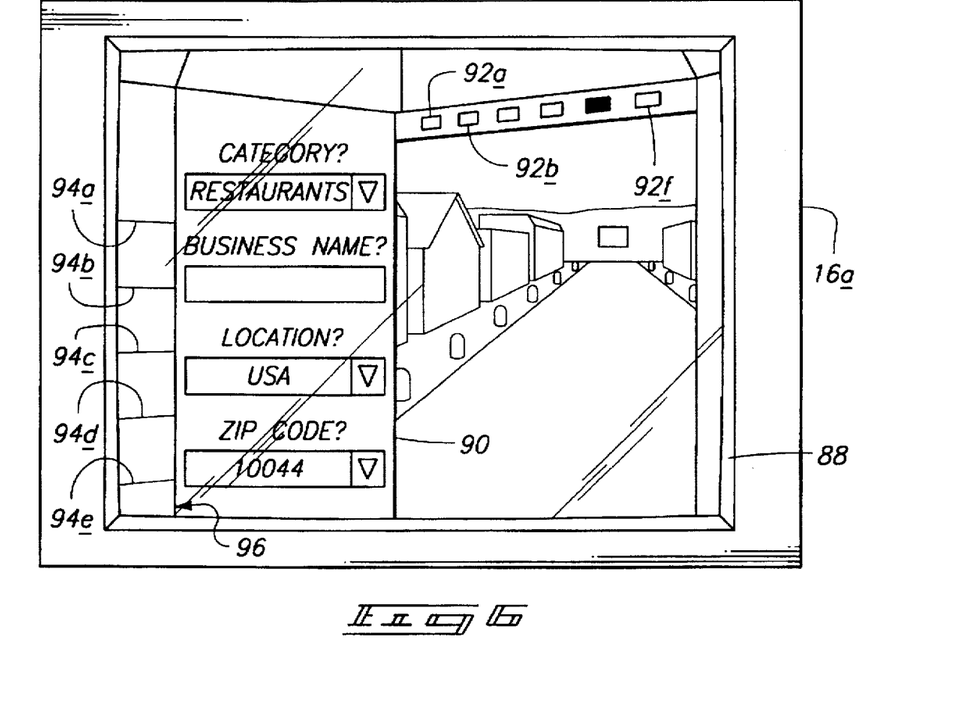
FIG. 6 illustrates another sample virtual reality scene produced by the system of FIG. 1.

FIG. 6 illustrates that the elevator door will open after the virtual reality scene has been constructed.

Figure 7:
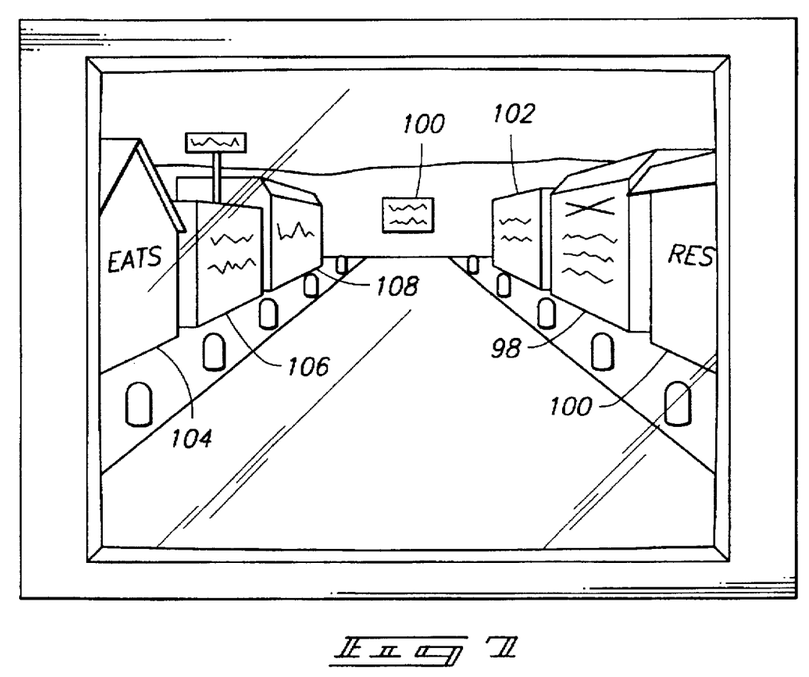
FIG. 7 illustrates another sample virtual reality scene produced by the system of FIG. 1.

FIG. 7 illustrates a scene after a user has navigated part way down a street.

Figure 8:
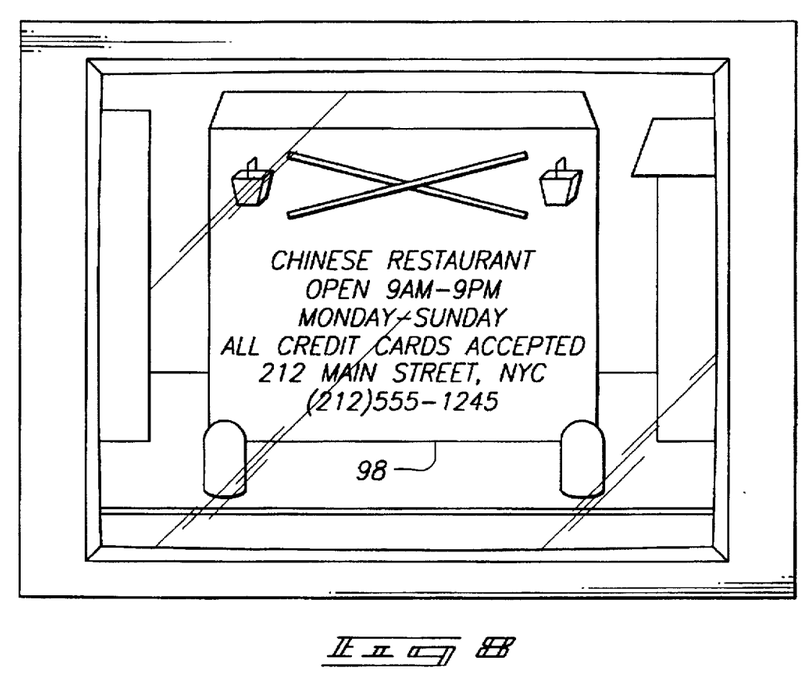
FIG. 8 illustrates another sample virtual reality scene produced by the system of FIG. 1.

FIG. 8 illustrates a user facing a storefront. The storefront can contain information that is typically contained in a Yellow Pages ad. If the user advances, the store is entered. This can result in the client connecting to the home page of the store, or other results, such as a virtual scene of a store interior including virtual reality objects.

Figure 9:
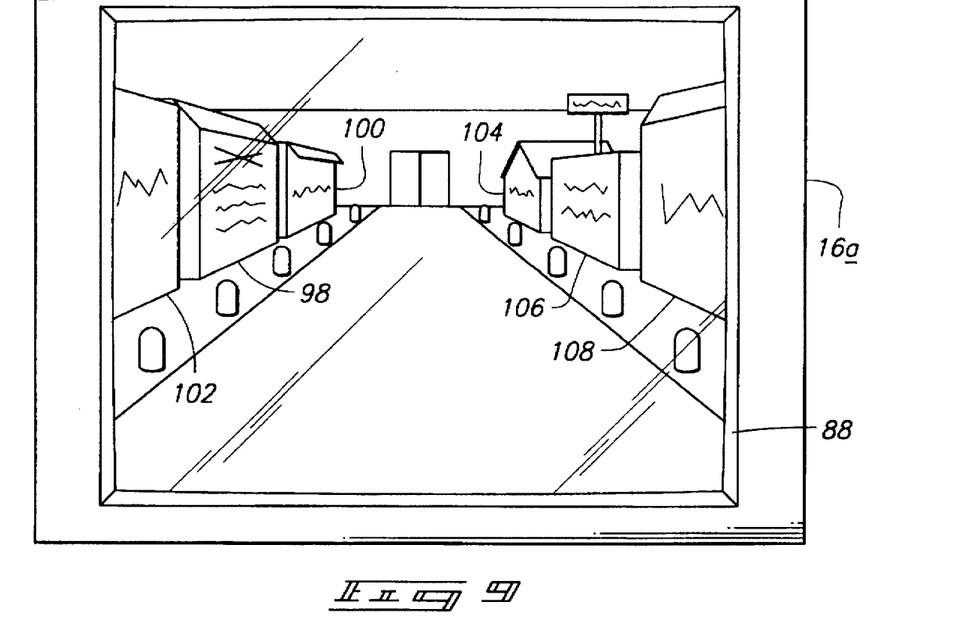
FIG. 9 illustrates another sample virtual reality scene produced by the system of FIG. 1.

FIG. 9 illustrates that a user can re-enter the elevator to perform a new search.

Figure 10:
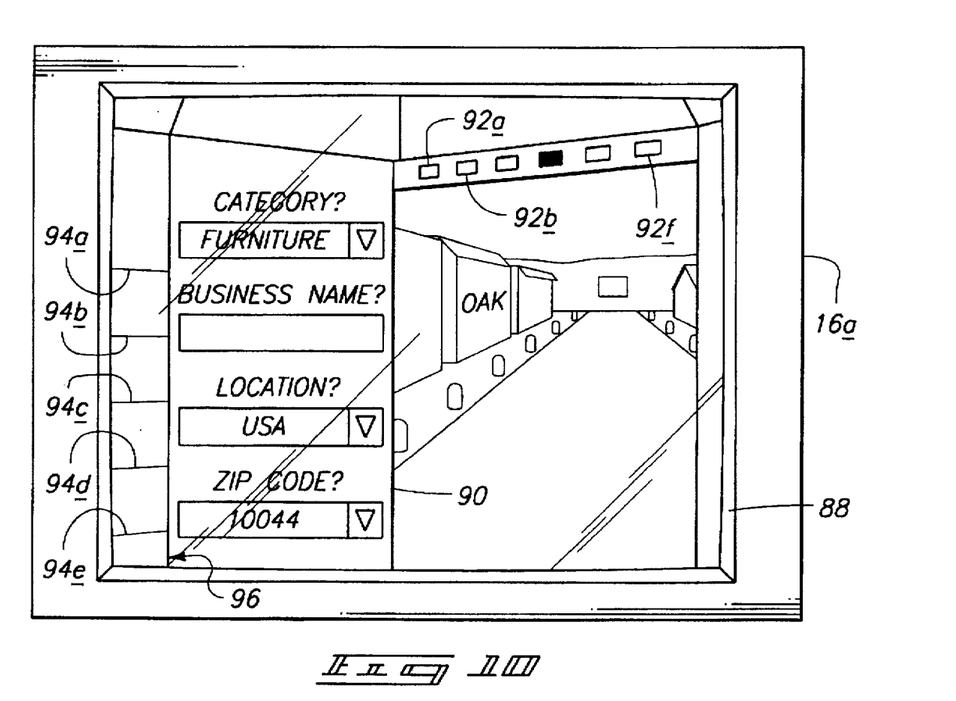
FIG. 10 illustrates another sample virtual reality scene produced by the system of FIG. 1.

FIG. 10 illustrates an alternative street created in response to a different search.

Thus, a system has been described which provides for presentation of Yellow Pages information in a more appealing format.

The invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A system comprising:
   a server having a memory, and a database defined in the memory; and
   a client in communication with the server, the server communicating to the client an interface for use in requesting a search of the database, and the server having virtual reality means for generating a virtual reality scene comprising a space in which a user can navigate by zooming in, zooming out and turning around, the virtual reality scene varying depending on the results of the search.

2. A system in accordance with claim 1 wherein the database comprises business names, phone numbers, and descriptions of products or services, for a plurality of businesses.

3. A system in accordance with claim 1 wherein the virtual reality scene is created using VRML.

4. A system in accordance with claim 1 wherein the server communicates with the client using TCP/IP.

5. A system in accordance with claim 1 wherein the client includes a web browser, and wherein the client accesses the server using the web browser.

6. A system in accordance with claim 1 wherein the client includes a web browser, and a virtual reality viewer, and wherein the virtual reality viewer is launched by the web browser when the client receives the virtual reality scene from the server.

7. A system in accordance with claim 1 wherein the database comprises at least two classifications of entries describing businesses, the entries including a first classification including a predetermined minimum amount of data concerning a business, and a second classification including more data concerning the business than the first classification.

8. A system in accordance with claim 1 wherein the virtual reality scene generated by the server presents the appearance of a street including storefronts of businesses.

9. A system in accordance with claim 1 wherein the virtual reality scene generated by the server presents the appearance of a street including storefronts of businesses, and wherein the appearance of the storefronts depends on the results of the search.

10. A system in accordance with claim 1 wherein the database comprises at least two classifications of entries describing businesses, the entries including a first classification including a predetermined minimum amount of data concerning a business, and a second classification including more data concerning the business than the first classification, wherein the virtual reality scene generated by the server presents the appearance of a street including storefronts of businesses, wherein the appearance of the storefronts depends on the results of the search, and wherein the appearance of the storefronts comprises a first set of storefronts corresponding to the first classification of entries, and a second set of storefronts corresponding to the second classification of entries.

11. A system in accordance with claim 1 wherein the interface has the appearance of an elevator.

12. A system in accordance with claim 1 wherein the interface has the appearance of an elevator and is a virtual reality space.

13. A system in accordance with claim 1 wherein the interface has the appearance of an elevator, and wherein the elevator appears to move while the server performs a database search.

14. A server comprising:
- a memory, and a database defined in the memory, the database including data about a first classification of businesses, which data respectively includes business name, address, phone number, and goods or services provided by the business, the database further including data about a second classification of businesses, which data respectively includes more data than is provided for each first classification business;
- communication hardware providing for communication between the server and clients via TCP/IP;
- the server communicating to the client an interface for use in requesting a search of the database in response to a client connecting to the server, and the server generating a virtual reality scene in response to the client requesting a search of the database, the virtual reality scene comprising a space in which a user can navigate by zooming in, zooming out and turning around, the virtual reality scene varying depending on the results of the search.

15. A system in accordance with claim 14 wherein the virtual reality scene is created using VRML.

16. A system in accordance with claim 14 wherein the virtual reality scene includes information about businesses which meet criteria of the search, and wherein the virtual reality scene visually differentiates any second classification businesses which meet the criteria of the search from first classification businesses which meet the criteria of the search.

17. A system in accordance with claim 16 wherein the virtual reality scene generated by the server presents the appearance of a street including storefronts of businesses.

18. A system in accordance with claim 14 wherein the virtual reality scene generated by the server presents the appearance of a street including storefronts of businesses, and wherein the appearance of the storefronts depends on the results of the search.

19. A system in accordance with claim 14 wherein the interface has the appearance of an elevator.

20. A system in accordance with claim 14 wherein the interface has the appearance of an elevator and is a virtual reality space.

21. A system in accordance with claim 14 wherein the interface has the appearance of an elevator, and wherein the elevator appears to move while the server performs a database search.

* * * * *